US008341822B2

(12) United States Patent
Rzasa et al.

(10) Patent No.: US 8,341,822 B2
(45) **Date of Patent: *Jan. 1, 2013**

(54) GROUND CONNECTOR

(75) Inventors: Michael Rzasa, Nashua, NH (US); Peter M. Wason, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/804,889

(22) Filed: Jul. 30, 2010

(65) Prior Publication Data

US 2010/0299909 A1 Dec. 2, 2010

Related U.S. Application Data

(62) Division of application No. 12/380,512, filed on Feb. 27, 2009, now Pat. No. 7,794,243.

(51) Int. Cl.

*B23P 11/00* (2006.01)
*H01R 4/28* (2006.01)
*H01R 4/66* (2006.01)

(52) U.S. Cl. ................ 29/525.11; 29/525.01; 29/525.02

(58) Field of Classification Search .................... 52/263, 52/146–152; 24/16 R, 20 R, 22, 24, 23 R, 24/23 EE, 305; 439/100, 101; 174/78; 248/74.1, 248/229.1, 316.1, 507–510, 346.05, 346.06; 29/525.01, 525.02, 525.11, 456

See application file for complete search history.

(56) References Cited

U.S. PATENT DOCUMENTS 774,099 A 11/1904 Narsh
846,202 A 3/1907 Harrah
1,056,173 A 3/1913 Higgin
2,107,594 A 2/1938 Bicknese ...................... 174/156
2,364,419 A 12/1944 Barnes ............................ 256/58
2,533,897 A * 12/1950 Reddock ....................... 439/804
2,915,268 A 12/1959 Wrobel
2,942,898 A 6/1960 Matthysse
3,046,511 A * 7/1962 Rinehuls et al. .............. 439/208
3,058,087 A * 10/1962 Piasecki ........................ 439/100
3,129,994 A 4/1964 Harmon et al. ............... 439/100
3,435,126 A 3/1969 Hamilton ........................ 174/78
3,861,771 A 1/1975 Cornell ........................ 339/95 R
3,901,577 A * 8/1975 Philibert et al. .............. 439/804
4,114,977 A 9/1978 Polidori ........................ 339/270
4,303,216 A 12/1981 Hollingsead .............. 248/74 PB
4,428,104 A 1/1984 Smith ............................. 24/279
RE31,689 E 10/1984 Bulanda et al. ............. 24/16 PB
4,494,024 A 1/1985 Braun .......................... 310/75 A
4,623,204 A 11/1986 Auclair .......................... 439/100
4,776,808 A * 10/1988 Davidson ...................... 439/100
4,863,390 A * 9/1989 Cera et al. ..................... 439/100
4,911,572 A * 3/1990 Williams ....................... 403/209
5,131,856 A * 7/1992 Auclair .......................... 439/100
5,286,211 A 2/1994 McIntosh ....................... 439/100
5,314,343 A 5/1994 Englander ...................... 439/100
5,616,036 A 4/1997 Polidori ......................... 439/100
5,632,633 A 5/1997 Roosdorp et al. ............. 439/100
D389,052 S 1/1998 Yamamoto ..................... D8/396
5,729,872 A 3/1998 Ginocchio ..................... 24/16 R (Continued)

*Primary Examiner* — Essama Omgba
(74) *Attorney, Agent, or Firm* — Harrington & Smith

(57) ABSTRACT

A ground connector including a first section and a second section. The first section includes a first member with a threaded post, a second member pivotably connected to the first member, and a pusher on the first member. The second member includes a stepped surface configured to be engaged by the pusher to clamp a pedestal directly between the first and second members. The second section is movably located on the threaded post and configured to directly contact and clamp a conductor towards the pedestal.

18 Claims, 8 Drawing Sheets

U.S. PATENT DOCUMENTS

| | | | | |
|---|---|---|---|---|
| 5,752,860 | A | 5/1998 | Greaves | 439/781 |
| 5,772,455 | A | 6/1998 | Auclair et al. | 439/100 |
| 6,398,596 | B1 | 6/2002 | Malin | 439/800 |
| D473,130 | S | 4/2003 | Leung | D8/396 |
| 6,619,627 | B2 | 9/2003 | Salisbury et al. | 256/1 |
| 6,702,596 | B2 * | 3/2004 | Auclair | 439/99 |
| 6,742,223 | B1 | 6/2004 | Chang | 24/16 R |
| 6,763,555 | B2 | 7/2004 | Storer et al. | 24/274 R |
| 6,877,996 | B1 * | 4/2005 | Franks, Jr. | 439/92 |
| 6,986,673 | B2 | 1/2006 | De la Borbolla | 439/100 |
| 7,052,331 | B2 | 5/2006 | Maxwell et al. | 439/758 |
| 7,096,543 | B2 | 8/2006 | Castellanos | 24/16 PB |
| 7,122,739 | B2 | 10/2006 | Franks, Jr. | 174/51 |
| 7,160,142 | B2 * | 1/2007 | Hughes et al. | 439/479 |
| 7,537,494 | B1 * | 5/2009 | Umlauf | 439/798 |
| 7,794,243 | B1 * | 9/2010 | Rzasa et al. | 439/100 |
| 7,922,546 | B1 * | 4/2011 | Smith et al. | 439/793 |
| 7,946,862 | B2 * | 5/2011 | Schluter | 439/100 |
| 7,988,464 | B2 * | 8/2011 | Kossak et al. | 439/92 |
| 8,007,293 | B2 * | 8/2011 | Boutin | 439/100 |
| 8,038,453 | B2 * | 10/2011 | Robicheau et al. | 439/100 |
| 2002/0090847 | A1 * | 7/2002 | De France | 439/100 |
| 2002/0176674 | A1 * | 11/2002 | Auclair | 385/101 |
| 2004/0005796 | A1 * | 1/2004 | Auclair | 439/99 |
| 2008/0202794 | A1 | 8/2008 | Cho | 174/169 |
| 2010/0144173 | A1 * | 6/2010 | Wason | 439/100 |
| 2010/0221934 | A1 * | 9/2010 | Robicheau et al. | 439/100 |
| 2011/0017880 | A1 * | 1/2011 | Osborn et al. | 248/74.1 |
| 2011/0151703 | A1 * | 6/2011 | Parker et al. | 439/338 |

* cited by examiner

GROUND CONNECTOR

CROSS REFERENCE TO RELATED APPLICATION

This is a divisional patent application of application Ser. No. 12/380,512 filed Feb. 27, 2009, now U.S. Pat. No. 7,794,243, which is hereby incorporated by reference in its entirety.

BACKGROUND OF THE INVENTION

1. Field of the Invention

The invention relates to a raised floor system and, more particularly, to grounding in a raised floor system.

2. Brief Description of Prior Developments

It is known in raised floor structures, used in a building having numerous computer or telephone or electrical devices, to provide a grounding network. The understructure of a raised floor system includes multiple pedestals and perhaps stringers and seismic supports. Floor panels are located on top of the pedestals. The panels can include, for example, aluminum panels, or steel panels such as hollow, perforated, grated, concrete filled, wood filled and calcium chloride filled.

A grounding network of a raised floor system can comprise ground conductors or cables arranged in a parallel grid or a perpendicular grid. A ground connector is used to connect the cable to the pedestal of the raised floor system. U.S. Pat. No. 5,286,211 discloses a ground connector where conductors can be clamped directly against a post in two orthogonal orientations. There is a desire for a faster and less expensive way to connect a ground conductor to a pedestal of a raised floor system.

SUMMARY

The following summary is merely intended to be exemplary. The summary is not intended to limit the scope of the claimed invention.

In accordance with one aspect of the invention, a ground connector is provided including a first section and a second section. The first section includes a first member with a threaded post, a second member pivotably connected to the first member, and a pusher on the first member. The second member includes a stepped surface configured to be engaged by the pusher to clamp a pedestal directly between the first and second members. The second section is movably located on the threaded post and configured to directly contact and clamp a conductor towards the pedestal.

In accordance with another aspect of the invention, a ground connector is provided comprising a first section and a second section. The first section comprises a first member with a threaded post, and a clamping system comprising a screw rotatably connected to the first member. The screw has an end tip which is configured to apply a compression force to assist in clamping the first section against opposite sides of a support. The second section is movably located on the threaded post and configured to directly contact and clamp a conductor towards the support.

In accordance with another aspect of the invention, a method is provided comprising connecting a first section of a ground connector to a pedestal, wherein the first section comprises a first member with a threaded post, a second member pivotably connected to the first member, and a screw on the first member, wherein the second member comprises teeth, and wherein one of the teeth is engaged by an end tip of the screw to clamp a pedestal directly between the first and second members; and positioning a second section on the threaded post to directly contact and clamp a conductor towards the pedestal.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 1:
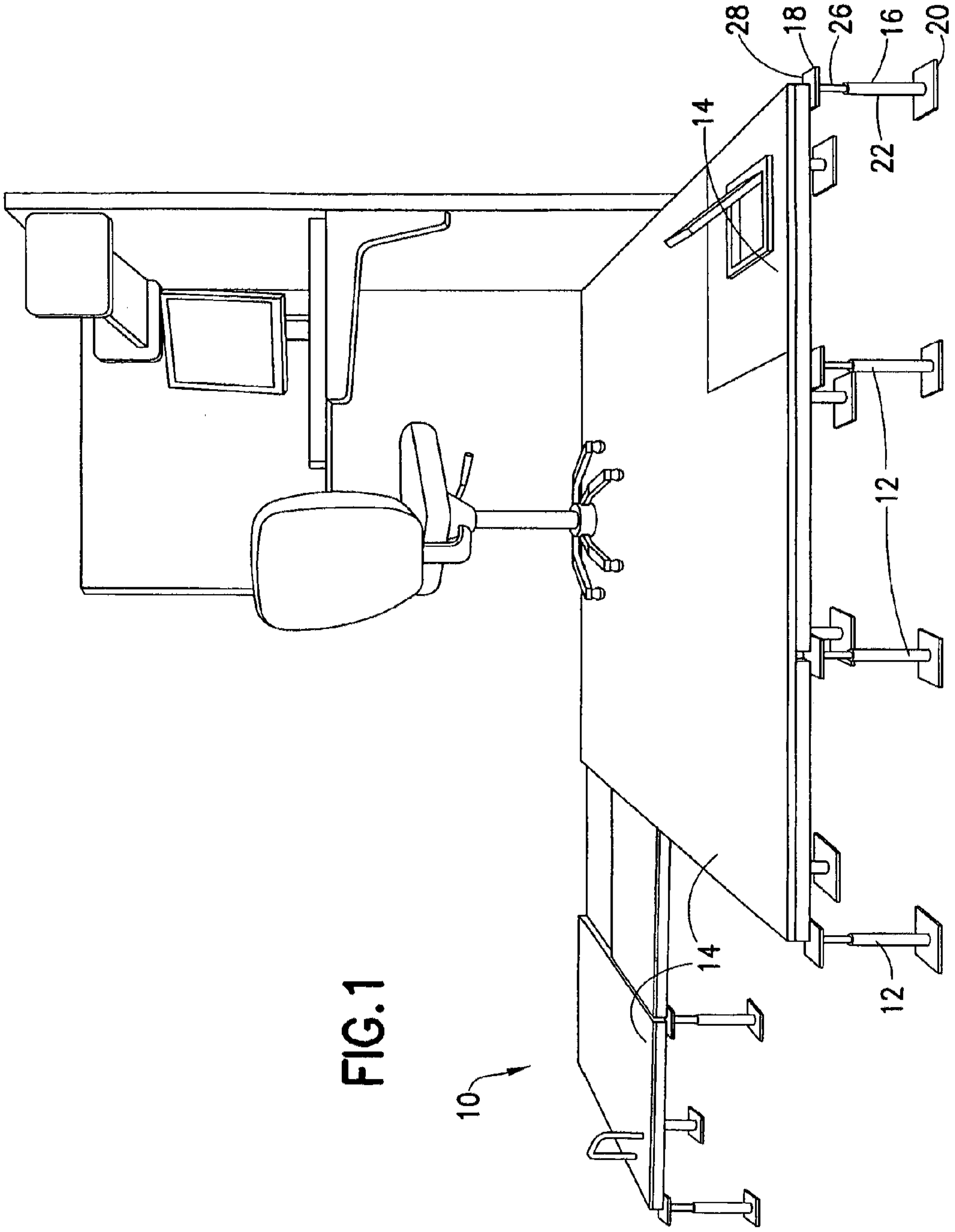
FIG. 1 is a perspective view of a raised floor system comprising features of the invention.

Referring to FIG. 1, there is shown a view of a raised floor system 10 incorporating features of the invention. Although the invention will be described with reference to the example embodiments shown in the drawings, it should be understood that the invention can be embodied in many alternate forms of embodiments. In addition, any suitable size, shape or type of elements or materials could be used.

The system 10 generally comprises pedestals 12 and panels 14. The panels 14 are conventional panels of a raised floor system. Each pedestal 12 generally comprises a first section 16 and a second section 18. The second section 18 is adjustably connected to the first section 16 in this embodiment. However, in alternate embodiments the second section might not be movably connected to the first section. The first section 16 comprises a base 20 and a post 22. The base and post are preferably comprised of metal. In this embodiment the post 22 is stationarily attached to the base, such as by welding. However, in alternate embodiments the base and post could be integrally formed or connected in any other suitable method.

The base 20 is sized and shaped to sit or rest on a floor, such as a concrete floor of an office building for example. The base 20 has a general square or rectangular planar shape, but could have other shapes. In an alternate embodiment the base could be sized and shaped to connect to another member.

The post 22 extends upward from the base 20. The post 22 has a general tube shape. In the embodiment shown the tube shape is generally circular in cross section, but could have alternative cross sectional shapes. An aperture extends into the top end of the post 22 into the central channel of the tube shape.

The second section 18 generally comprises a post 26 and a top support 28. The post 26 and top support 28 are conventional in this embodiment. The post 26 is a threaded post with threads on its exterior side. The top support 28 is connected to the top end of the post 26. The top side of the top support 28 is adapted to support the panels 14 thereon.

The second section 18 comprises an adjuster, such as a nut. The adjuster is connected to the threads of the post 26. The bottom side of the nut rests on the top end of the post 22. In alternate embodiments any suitable type of height adjustment system between the first and second sections could be provided.

The bottom end of the post 26 extends into the center channel of the post 22 through the open top end of the post 22. With the nut resting on the top support surface of the post 22, when the nut is turned the post 26 can move up and down relative to the post 22. Thus, the height of the top support 28 relative to the base 20 can be adjusted.

Figure 2:
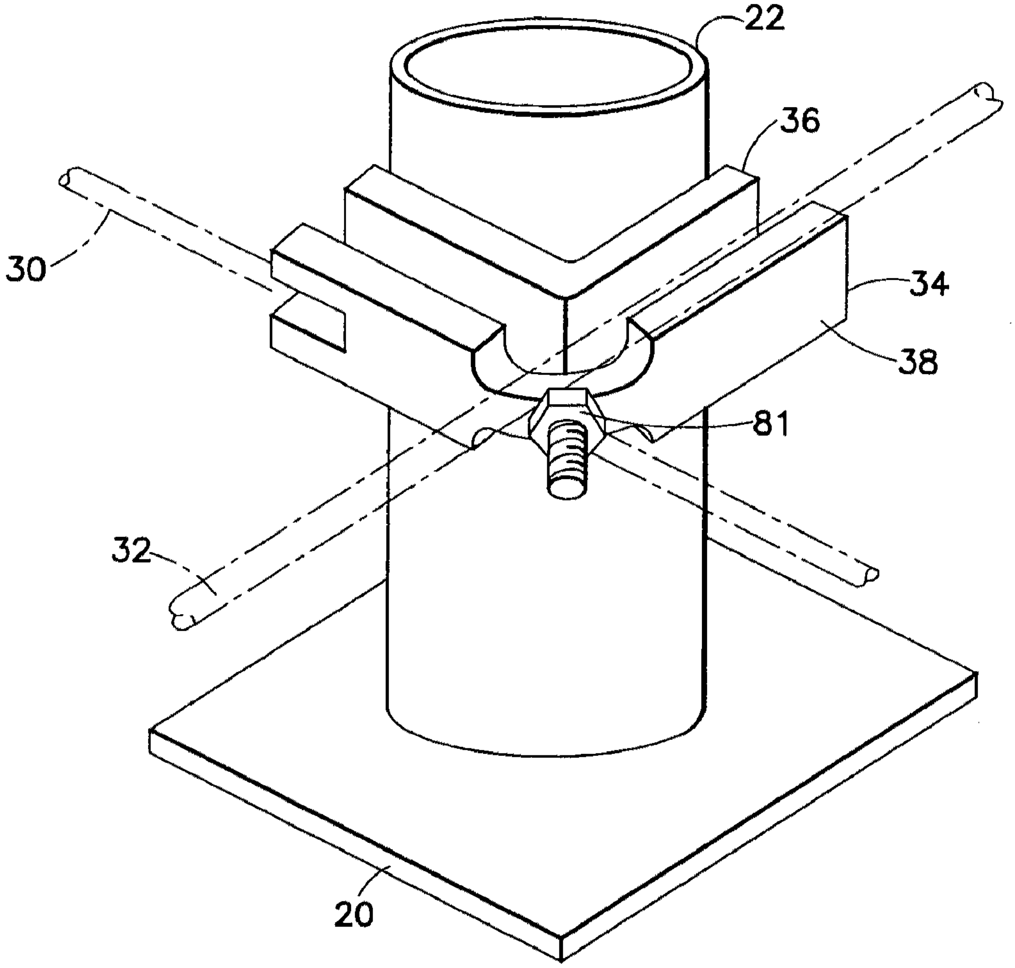
FIG. 2 is a perspective view of an electrical connector attached to one of the pedestals.
Figure 3:
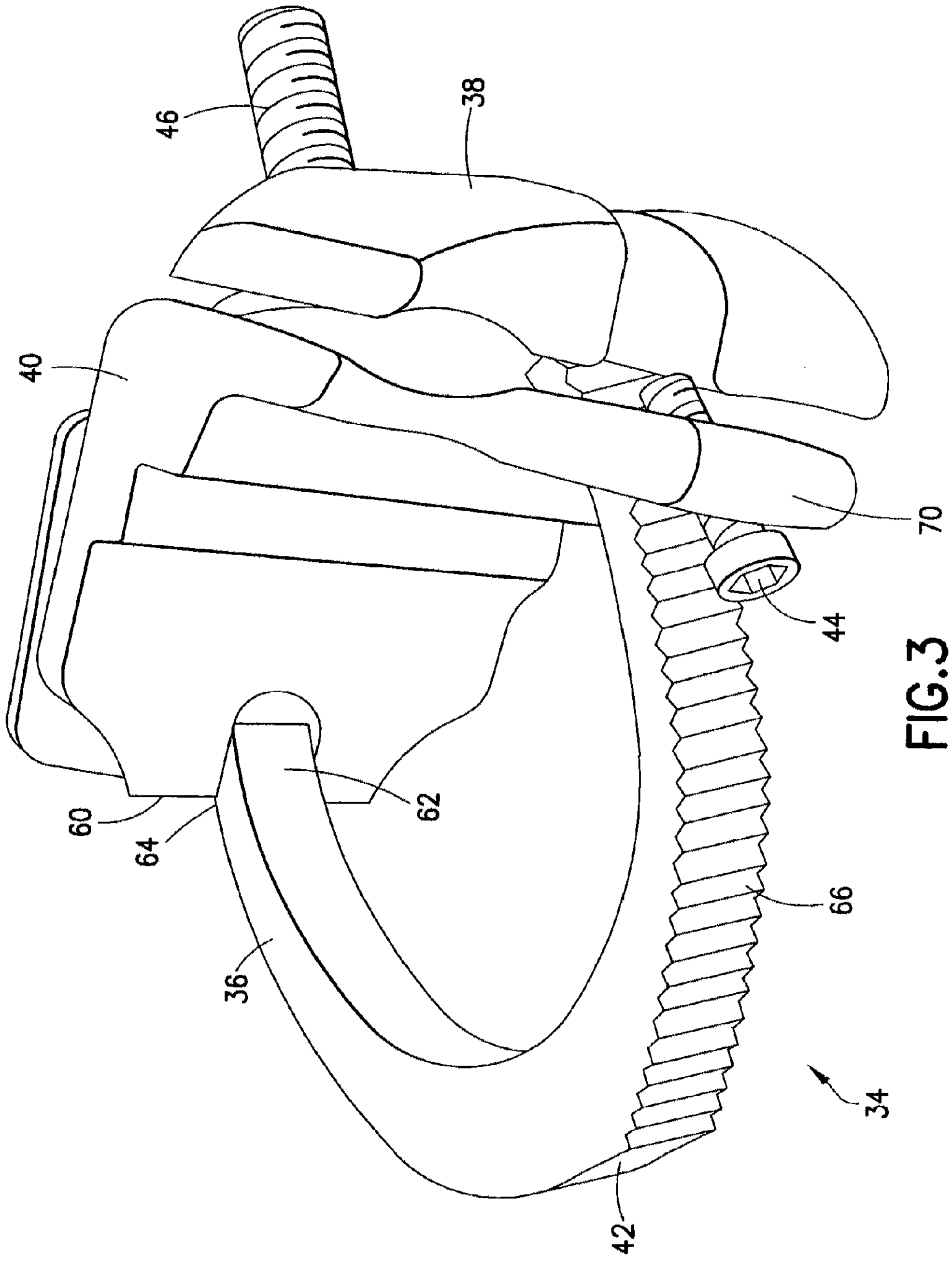
FIG. 3 is a perspective view of the electrical connector shown in FIG. 2.

Referring also to FIG. 2, the system 10 includes a grounding system which is used to ground the raised floor system to ground. The grounding system includes electrical conductors 30, 32 and electrical ground connectors 34. Referring also to FIG. 3, the connector 34 generally comprises a first section 36 and a second section 38. The first section 36 generally comprises a first member 40, a second member 42 and a pusher 44.

Figure 4:
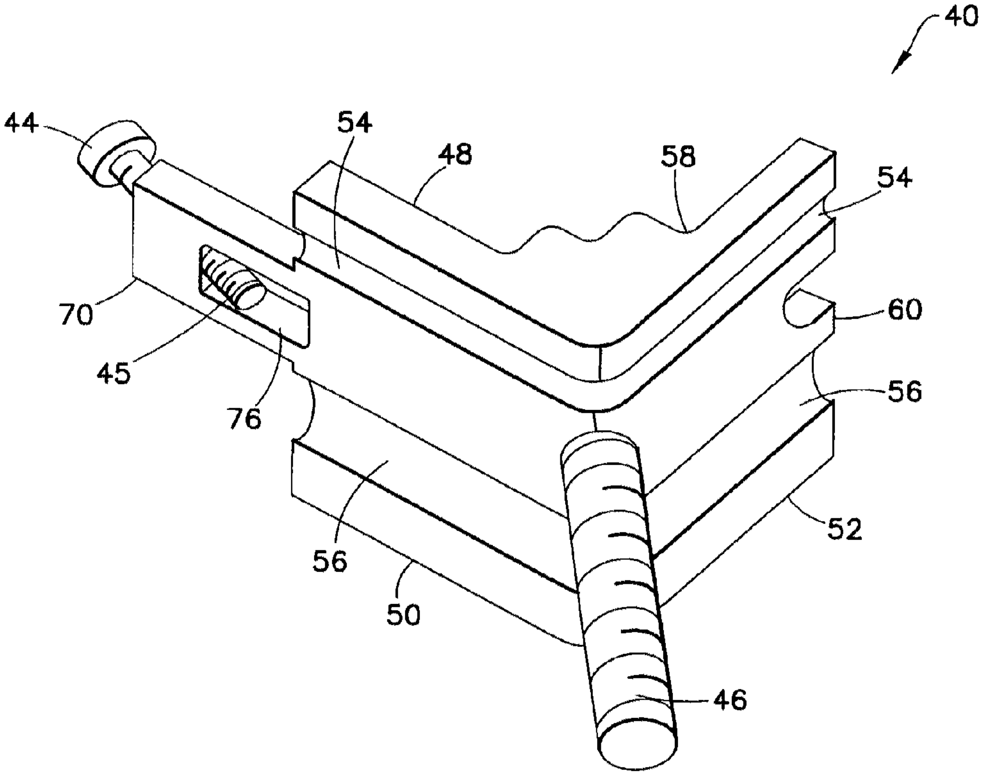
FIG. 4 is a perspective view of one of the members of the connector shown in FIGS. 2-3.
Figure 6:
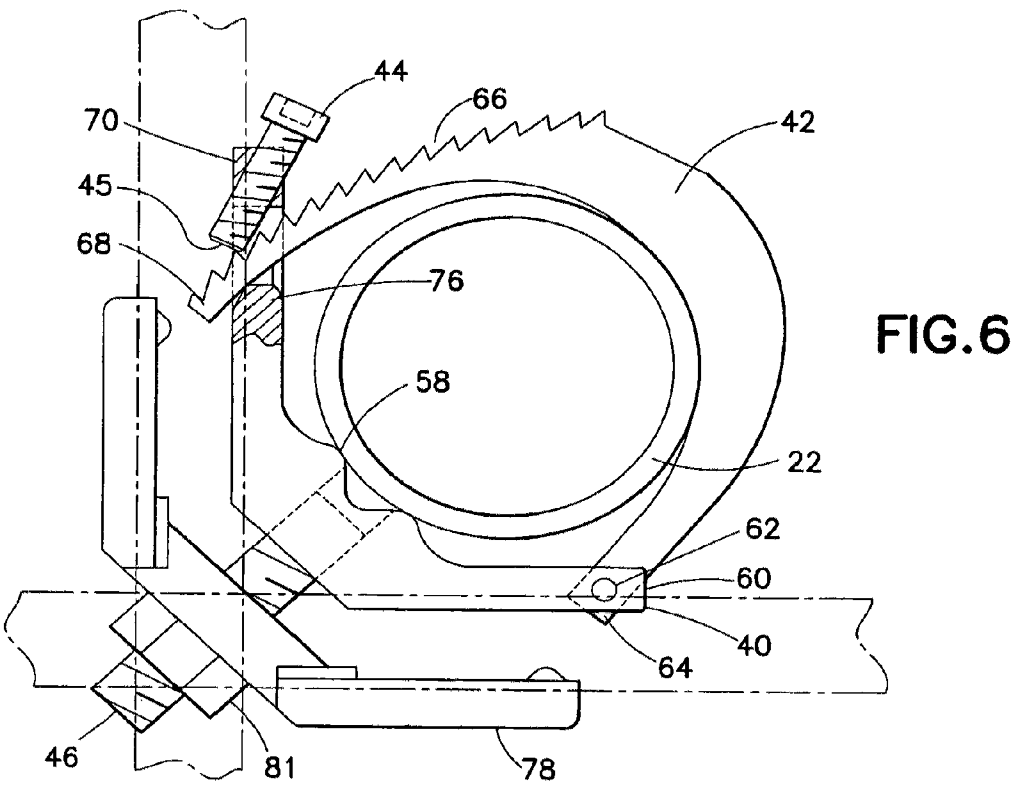
FIG. 6 is a cross sectional view of the connector shown in FIGS. 2-3 attached to the pedestal.

Referring also to FIG. 4, the first member 40 is a one-piece substantially rigid metal member. The first member 40 has a general V shaped member 48 and a threaded post 46. The member 48 has two sections 50, 52 which are generally orthogonal to each other. Exterior facing sides of the sections 50, 52 each have two conductor receiving grooves 54, 56 therealong. In this embodiment the grooves have different sizes, but they could have the same size. As shown in FIG. 6, the opposite facing side 58 is configured to be located directly against the exterior surface of the post 22.

Figure 7:
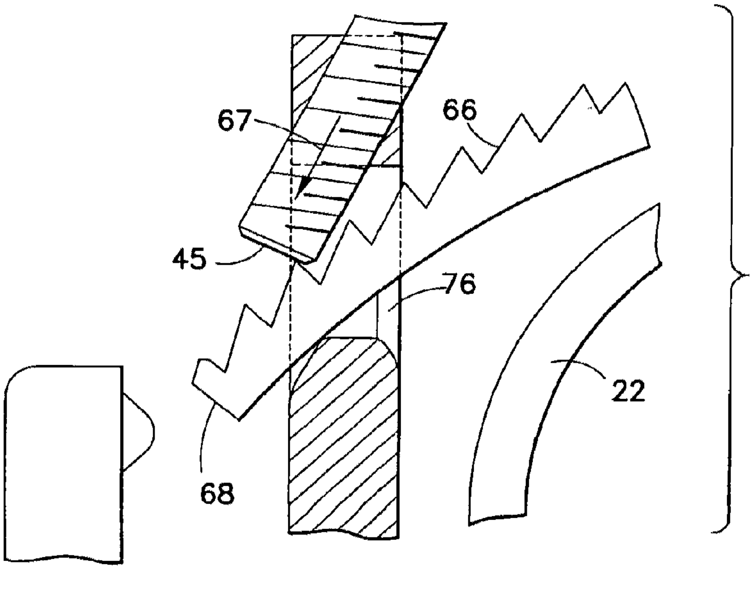
FIG. 7 is an enlarged view of a portion of the connector shown in FIG. 6.
Figure 8:
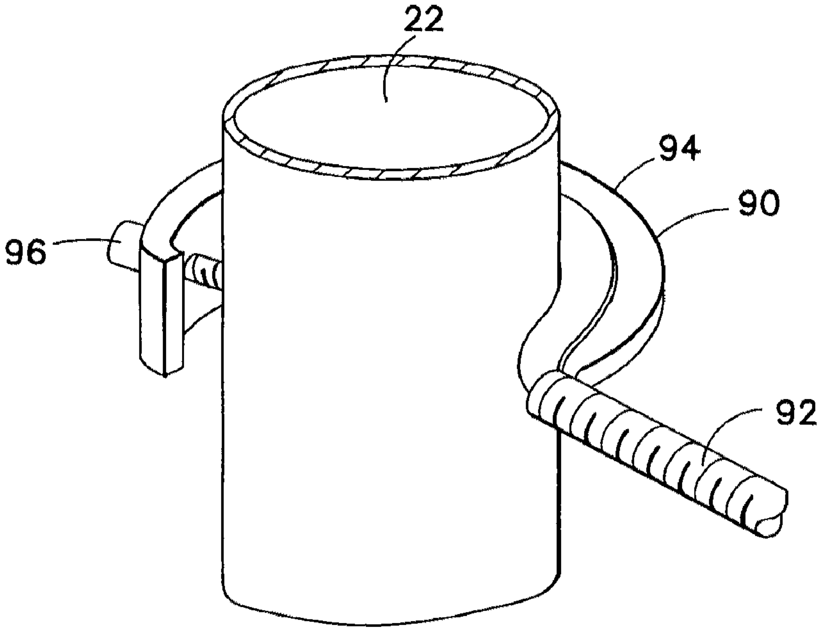
FIGS. 8-11 are perspective views an alternate embodiment of one of the sections of the connector shown in FIGS. 2-3.
Figure 9:
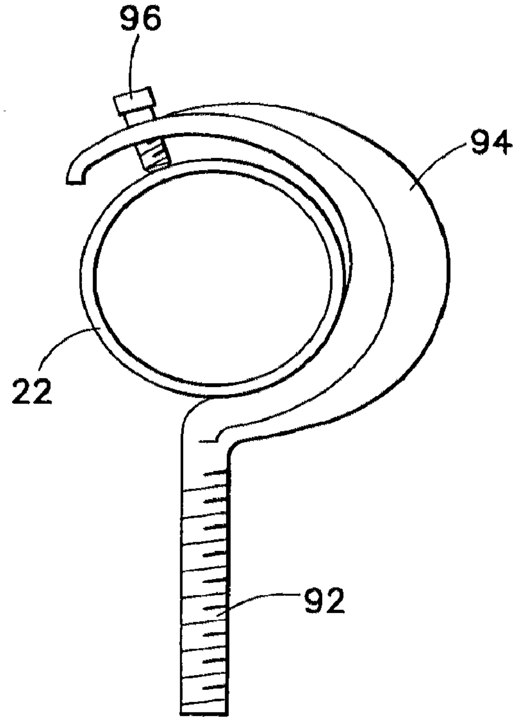
Figure 10:
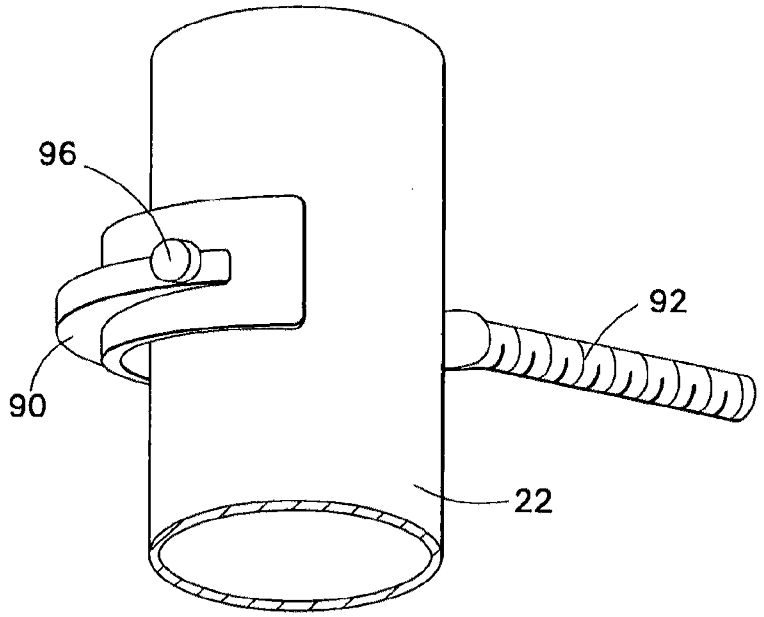
Figure 11:
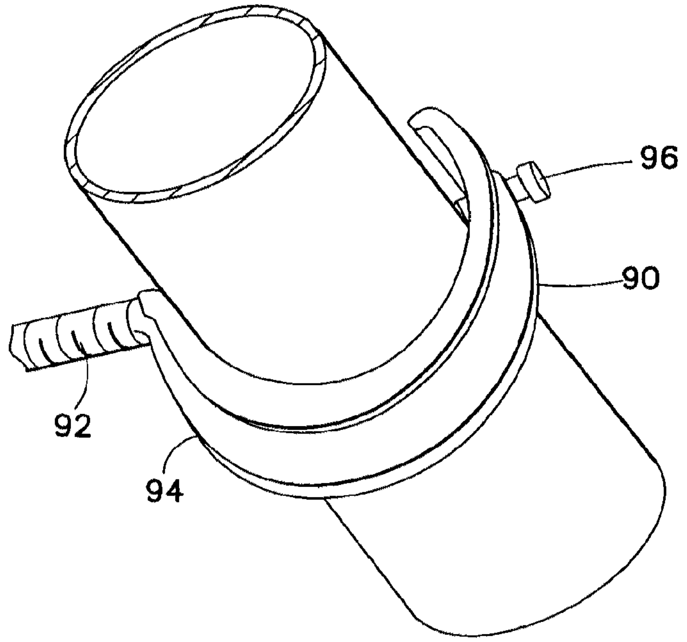

Referring also to FIGS. 6-7, the second member 42 is pivotably connected to a first end 60 of the first member 40 at pivot connection 62. The second member 42 is a one-piece substantially rigid metal member having a general curved shape. However, the member 42 might not be completely rigid. A first end 64 is pivotably connected at the pivot connection 62. A side of the second member 42 has teeth or stepped surfaces 66 which extend to a second end 68 of the second member 42.

The pusher 44 is located at the second end 70 of the first member 40. The pusher 44 comprises a screw in this embodiment, but in alternate embodiments the pusher might comprise a different type of member. The end 70 has an aperture 76 to allow the second end 68 of the second member 42 to pass therethrough. The screw 44 is threadingly connected to the second end 70 and has an end tip 45 which can project into the aperture 76.

When the screw 44 is rotated by a user, the second member 42 can be moved inward into the aperture 76. The tip 45 presses on one of the teeth 66 in direction 67 (see FIG. 7). Thus, the space between opposite sides of the surface 58 of the first member 40 and the inward facing surface of the second member 42 can be decreased. When decreased, the members 40, 42 can clamp the post 22 directly therebetween to mechanically and electrically connect the first section 36 to the post 22. Although only one tooth or stepped surface is used, multiple teeth 66 are provided to allow the first section to connect to different size posts 22.

Figure 5:
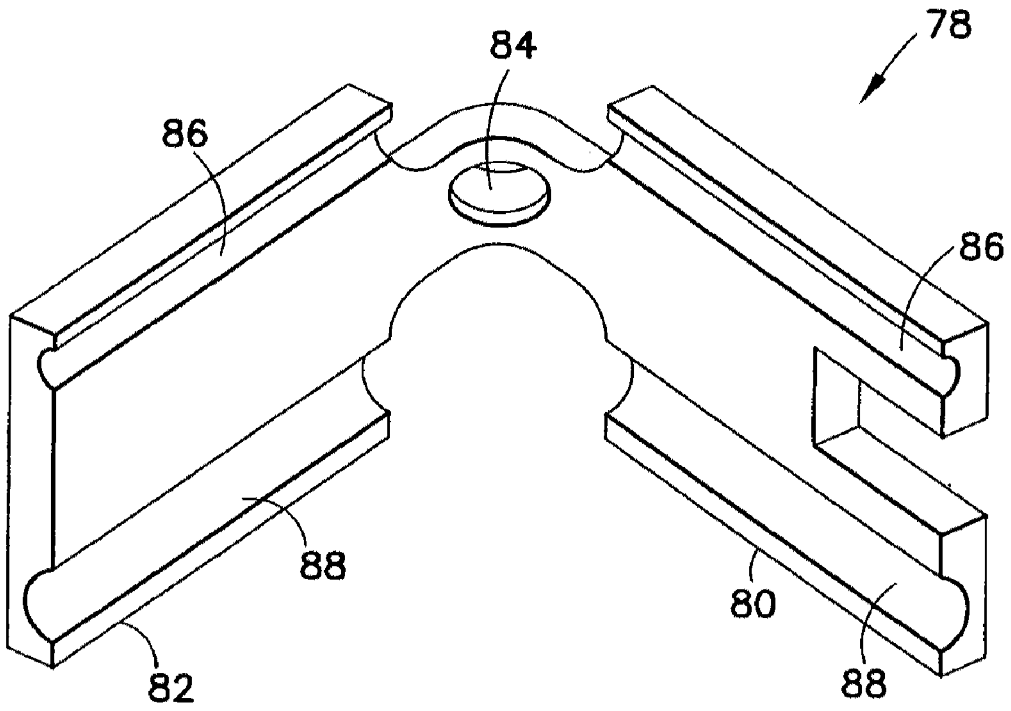
FIG. 5 is a perspective view of another one of the members of the connector shown in FIGS. 2-3.

The second section 38 has a one-piece member 78 and a fastener 81 (see FIG. 2), such as a nut. Referring also to FIG. 5, the one-piece member 78 is preferably made of metal and comprises a general V shape with two generally orthogonal sections 80, 82 and a through-hole 84 between the two generally orthogonal sections. The post 46 is located through the through-hole 84. The inner facing sides of the sections 80, 82 comprise conductor receiving grooves 86, 88.

The conductors 30, 32 can be located in the grooves 54, 56, 86, 88 and the nut 81 tightened to clamp the conductors directly between the members 40, 78. Thus, the conductors 30, 32 can be electrically connected to each other and to the post 22.

Referring also to FIGS. 8-11, an alternate embodiment of the first section is shown connected to the post 22. In this embodiment the first section has a one-piece metal member 90 comprising a threaded post 92 and a general C shaped section 94. The threaded post 92 is located at a first end of the C shaped section 94. A screw 96 is connected to an opposite second end of the C shaped section 94. A tip of the screw 96 can be tightened directly onto post 22 to attached the member 90 to the post. The member 78 and nut 81 can be used on the threaded post 92 to clamp the conductors 30, 32 directly against the exterior side of the post 22.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. A method comprising;

connecting a first section of a ground connector to a pedestal, wherein the first section comprises a first member with a threaded post, a second member pivotably connected to the first member, and a screw on the first member, wherein the second member comprises teeth, and wherein one of the teeth is engaged by an end tip of the screw to clamp a pedestal directly between the first and second members; and positioning a second section on the threaded post to directly contact and clamp a conductor towards the pedestal.

2. A method as in claim 1 wherein the first member comprises a general V shaped member wherein connecting the first section to the pedestal comprises an inner surface of the general V shaped member directly contacting the pedestal, and outer surfaces having conductor receiving grooves with the conductor being located in one of the grooves.

3. A method as in claim 2 wherein the outer surfaces of the first member comprise two surfaces which are generally orthogonal to each other, wherein the conductor is on a first one of the surfaces and further comprising a second conductor being located on a second one of the surfaces.

4. A method as in claim 1 wherein the second section comprises a one piece member haying a general V shape with two generally orthogonal sections and a through-hole between the two generally orthogonal sections, wherein positioning the second section on the threaded post comprises the post extending through the through-hole.

5. A method as in claim 4 wherein the two generally orthogonal sections have inward facing sides wherein positioning the second section on the threaded post comprises one of the sides of the orthogonal sections being located directly against the conductor.

6. A method as in claim 1 further comprising locating a fastener on the post to press the second section in a direction towards the pedestal.

7. A method as in claim 1 wherein the second member is a one piece member having a general curved shape with a first end pivotably connected to a first end of the first member, and a second end having the teeth thereon, and the method further comprises rotatably connecting the screw to a second end of the first member.

8. A method comprising:

connecting a first section of a ground connector to a pedestal, wherein the first section comprises:

a first member, a second member movably connected to the first member, and a fastener on the first member, wherein the fastener engages the second member to clamp the first and second members together around the pedestal; and positioning a second section on the first member to directly contact and clamp an electrical ground conductor between the first and second sections, wherein positioning the second section on the first member comprises the second section being positioned on a post of the first member.

9. A method as in claim 8 wherein positioning the second section on the first member comprises the second section having a hole and the post extending through the hole.

10. A method as in claim 9 further comprising connecting a second fastener to the post to press the second section towards the first section.

11. A method as in claim 10 wherein the post is a threaded post and the second fastener is a nut, wherein the nut is screwed onto the post.

12. A method as in claim 8 wherein the second member is pivotably connected to the first member, and wherein the fastener causes the second member to pivot on the first member to clamp the pedestal between the first and second members.

13. A method as in claim 8 wherein the fastener is rotatably connected to the first member, wherein connecting the first section to the pedestal comprises the fastener rotating on the first member and the fastener pushing against a portion of the second member.

14. A method as in claim 13 wherein the fastener pushing against the portion of the second member comprises an end of the fastener pressing against at least one of a plurality of teeth on the second member.

15. A method comprising:

connecting a first section of a ground connector to a pedestal, wherein the first section comprises:

a first member, a second member movably connected to the first member, and a fastener on the first member, wherein the fastener engages the second member to clamp the first and second members together around the pedestal; and positioning a second section on the first member to directly contact and clamp an electrical ground conductor between the first and second sections, wherein positioning the second section on the first member comprises the electrical ground conductor being located into a first groove on an outer facing surface of the first member and a second groove on an inner facing surface of the second member.

16. A method comprising:

connecting a first section of a ground connector to a pedestal, wherein the first section comprises:

a first member, and a clamping system comprising a screw rotatably connected to the first member, wherein the screw has an end tip which applies a compression force to assist in clamping the first section against opposite sides of the pedestal; and positioning a second section of the ground connector on the first member to contact and clamp an electrical ground conductor directly between the first and second sections, wherein the first member comprises a post, and wherein positioning the second section on the first member comprises locating the second section on the post.

17. A method as in claim 16 wherein the second section comprises a member with a hole, wherein the post is inserted into the hole.

18. A method as in claim 16 further comprising connecting a fastener to the post to press the second section towards the first member to thereby clamp the electrical ground conductor between the first member and second section.

* * * * *